(12) United States Patent
Meehan et al.

(10) Patent No.: US 7,274,759 B2
(45) Date of Patent: Sep. 25, 2007

(54) ANTENNA SWITCHING BASED ON A PREAMBLE MSE METRIC

(75) Inventors: Joseph Meehan, New York, NY (US); Sunghyun Choi, Montvale, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1038 days.

(21) Appl. No.: 10/028,385

(22) Filed: Dec. 21, 2001

(65) Prior Publication Data

US 2003/0119468 A1 Jun. 26, 2003

(51) Int. Cl.
*H04B 7/10* (2006.01)
(52) U.S. Cl. .................. 375/347; 455/132; 455/152
(58) Field of Classification Search ............... 375/346, 375/347, 348, 130, 136, 140, 147; 455/269, 455/272, 277.2, 277.1, 132
See application file for complete search history.

(56) References Cited

U.S. PATENT DOCUMENTS

| | | | | |
|---|---|---|---|---|
| 4,499,606 A | * | 2/1985 | Rambo | 455/277.2 |
| 4,742,568 A | * | 5/1988 | Furuya | 455/277.2 |
| 5,181,161 A | * | 1/1993 | Hirose et al. | 369/47.26 |
| 5,446,922 A | * | 8/1995 | Siwiak et al. | 455/277.2 |
| 5,742,646 A | * | 4/1998 | Woolley et al. | 375/349 |
| 5,748,676 A | * | 5/1998 | Mahany | 375/260 |
| 5,960,046 A | * | 9/1999 | Morris et al. | 375/347 |
| 6,009,307 A | * | 12/1999 | Granata et al. | 455/13.3 |
| 6,018,555 A | * | 1/2000 | Mahany | 375/347 |
| 6,029,057 A | * | 2/2000 | Paatelma et al. | 455/277.2 |
| 6,069,917 A | * | 5/2000 | Werner et al. | 375/233 |
| 6,169,728 B1 | * | 1/2001 | Perreault et al. | 370/235 |
| 6,483,884 B1 | * | 11/2002 | Shen et al. | 375/347 |
| 6,567,482 B1 | * | 5/2003 | Popovic' | 375/343 |
| 6,847,810 B2 | * | 1/2005 | Shen et al. | 455/277.2 |
| 7,099,380 B1 | * | 8/2006 | Feng et al. | 375/150 |
| 2004/0199835 A1 | * | 10/2004 | Belotserkovsky et al. | 714/704 |
| 2005/0063496 A1 | * | 3/2005 | Guillouard et al. | 375/346 |

FOREIGN PATENT DOCUMENTS

WO WO9602984 6/1995

\* cited by examiner

*Primary Examiner*—Temesghen Ghebretinsae
*Assistant Examiner*—Juan Alberto Torres
(74) *Attorney, Agent, or Firm*—Larry Liberchuk

(57) ABSTRACT

An apparatus and method for improving the signal reception of a digital wireless receiver comprises a processing circuit for processing the preamble information of incoming signals, wherein a first predetermined portion of the preamble information is applied to a first antenna and a second predetermined portion of the preamble information is applied to a second antenna to produce a plurality of processed signals, such that the plurality of processed signals is compared to a predefined preamble sequence to obtain a mean-square error (MSE) for the respective antenna. Then, one of the first and second antennas with a lower MSE is selected to receive and process the incoming signals.

17 Claims, 4 Drawing Sheets

ANTENNA SWITCHING BASED ON A PREAMBLE MSE METRIC

BACKGROUND OF THE INVENTION

1. Field of the Invention

The present invention relates to the field of wireless communication, and more particularly to a method and system for improving the signal reception of a digital wireless receiver.

2. Description of the Invention

In wireless communication systems, a plurality of antennas is used to maximize the desired received signal power to improve system performance. As such, multiple tuners are required in the receiver so that the signals can be combined. To minimize the cost of a receiver while enhancing the signal reception performance, a form of antenna switching is implemented. For example, in a wireless local area network (WLAN), stations use two antennas for signal processing, such that one of the antennas with a greater signal power is selected for reception and processing. To this end, the signal strength detected by the antennas is used as the basis for antenna switching. However, this type of antenna switching scheme does not take into account the inter-symbol interference. Therefore, there exists a need to provide an improved antenna switching method to suppress interference and enhance the signal reception of a wireless receiver.

SUMMARY OF THE INVENTION

The present invention relates to a method and apparatus for enhancing the signal reception of a digital wireless receiver.

According to an aspect of the invention, the method for enhancing the signal reception of a digital wireless receiver includes the steps of: extracting preamble information from a plurality of incoming signals; processing a first predetermined portion of the preamble information with a first antenna to produce a first preamble sequence; processing a second predetermined portion of the preamble information with a second antenna to produce a second preamble sequence; calculating a mean-square error (MSE) for the first preamble sequence received from the first antenna and the second preamble sequence received from the second antenna; comparing the first preamble sequence and the second preamble sequence with a predefined preamble sequence, which is known a priori; and, selecting one of the first antenna and the second antenna having a lower MSE for subsequent reception of the incoming signals. The processing steps further comprise the step of demodulating the first predetermined portion of the preamble information received by the first antenna to obtain the first preamble sequence, and demodulating the second predetermined portion of the preamble information received by the second antenna to obtain the second preamble sequence.

According to another aspect of the invention, the method for enhancing the signal reception of a digital wireless receiver includes the steps of: receiving a plurality of incoming signals; dividing the header information of the incoming signals to process the divided header information by a first antenna and a second antenna; comparing the processed header information from the first antenna and the second antenna with a predefined preamble sequence to obtain a mean square error (MSE); and, selecting one of the first antenna and the second antenna having a lower MSE for subsequent reception of the incoming signals. The step of dividing the header information of the incoming signals further comprises the step of demodulating the header information of the incoming signals received from the first antenna and the second antenna to obtain the processed header information.

According to another aspect of the invention, the apparatus for enhancing the signal reception of a digital wireless receiver includes: a processing circuit for processing the preamble information of incoming signals, wherein a first predetermined portion of the preamble information is applied to a first antenna and a second predetermined portion of the preamble information is applied to a second antenna to produce a plurality of processed signals, and the plurality of processed signals is compared to a predefined preamble sequence to obtain a mean-square error (MSE) for the respective antenna; and, a selecting circuit for selecting one of the first antenna and the second antenna having a lower MSE for subsequent reception of the incoming signals. The apparatus further includes a means for demodulating the preamble information of the incoming signals received from the first antenna and the second antenna to obtain the plurality of processed signals.

According to another aspect of the invention, the selection of an antenna can be performed based on a time-varying MSE convergence rate plotted in a x-y graph, wherein one of the antennas with a faster convergence rate is selected for subsequent reception of incoming signals. Also, if the MSE for the preamble sequence received from one of the antenna is lower than a predetermined threshold value, the antenna having lower MSE than the predetermined threshold value is selected for receiving and processing incoming signals thereafter.

According to a further aspect of the invention, the apparatus for enhancing the signal reception of incoming signals of a digital wireless receiver includes: a first antenna for receiving the incoming signals; a second antenna for receiving the incoming signals; a processing circuit for processing the preamble information of the incoming signals, wherein a first predetermined portion of the preamble information is applied to the first antenna and a second predetermined portion of the preamble information is applied to the second antenna to produce a plurality of processed signals, and the plurality of processed signals are compared to a predefined preamble sequence to generate a mean-square error (MSE) for the respective antenna; and, a selecting circuit for selecting one of the first antenna and the second antenna having a lower MSE for subsequent reception of the incoming signals. The apparatus further includes a means for demodulating the preamble information of the incoming signals received from the first antenna and the second antenna to obtain the plurality of processed signals.

The foregoing and other features and advantages of the invention will be apparent from the following, more detailed description of preferred embodiments as illustrated in the accompanying drawings in which reference characters refer to the same parts throughout the various views. The drawings are not necessarily to scale, the emphasis is placed instead upon illustrating the principles of the invention.

BRIEF DESCRIPTION OF THE DRAWINGS

The above and other features and advantages of the present invention will become more apparent from the following detailed description when taken in conjunction with the accompanying drawings, in which.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. Moreover, for the purpose of clarity, detailed descriptions of well-known devices, circuits, and methods are omitted so as not to obscure the description of the present invention with unnecessary detail.

Although the present invention is particularly well suited for use in a wireless local area network (WLAN) and will be described hereinafter with respect to this application, it should be noted that the method and apparatus disclosed herein can be applied to other digital wireless communication systems, such as the North American Mobile Radio Standard and the Group Special Mobile (GSM) based systems (also known as Global system for Mobile communication, which is a digital cellular phone service used in Europe and Japan), and the Digital European Cordless Telecommunications (DECT) based system, which is a pan-European digital cordless telephony interface specification.

Figure 1:
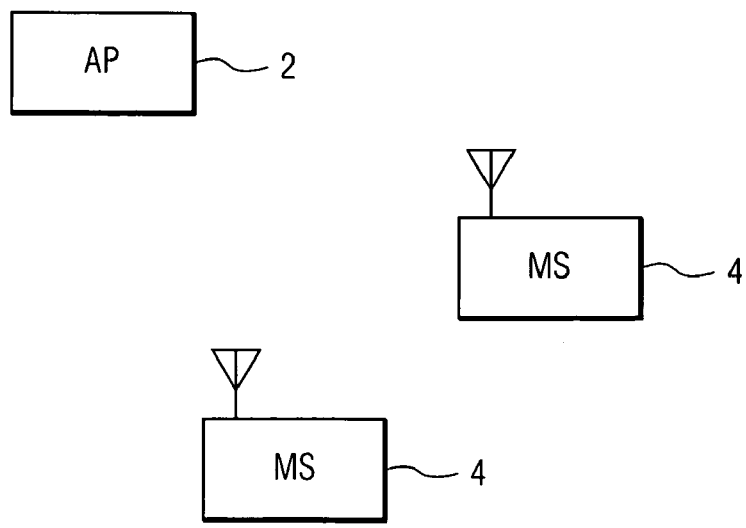
FIG. 1 illustrates a simplified block diagram of the communication system whereto the embodiment of the present invention may be applied.

FIG. 1 illustrates a representative network whereto the embodiments of the present invention may be applied. As shown in FIG. 1, an access point (AP) 2 is coupled to a plurality of mobile stations 4 ($STA_1$), which through a wireless link is communicating with each other and to the AP 2 via a plurality of wireless channels. The stations 4 and the AP 2, which are within the same radio coverage, are known as a basic service set (BSS). The main functions of the AP are to support roaming (i.e., changing access points), synchronize within a BSS, support power management, and control the medium access to support time-bounded service within a BSS.

Figure 2:
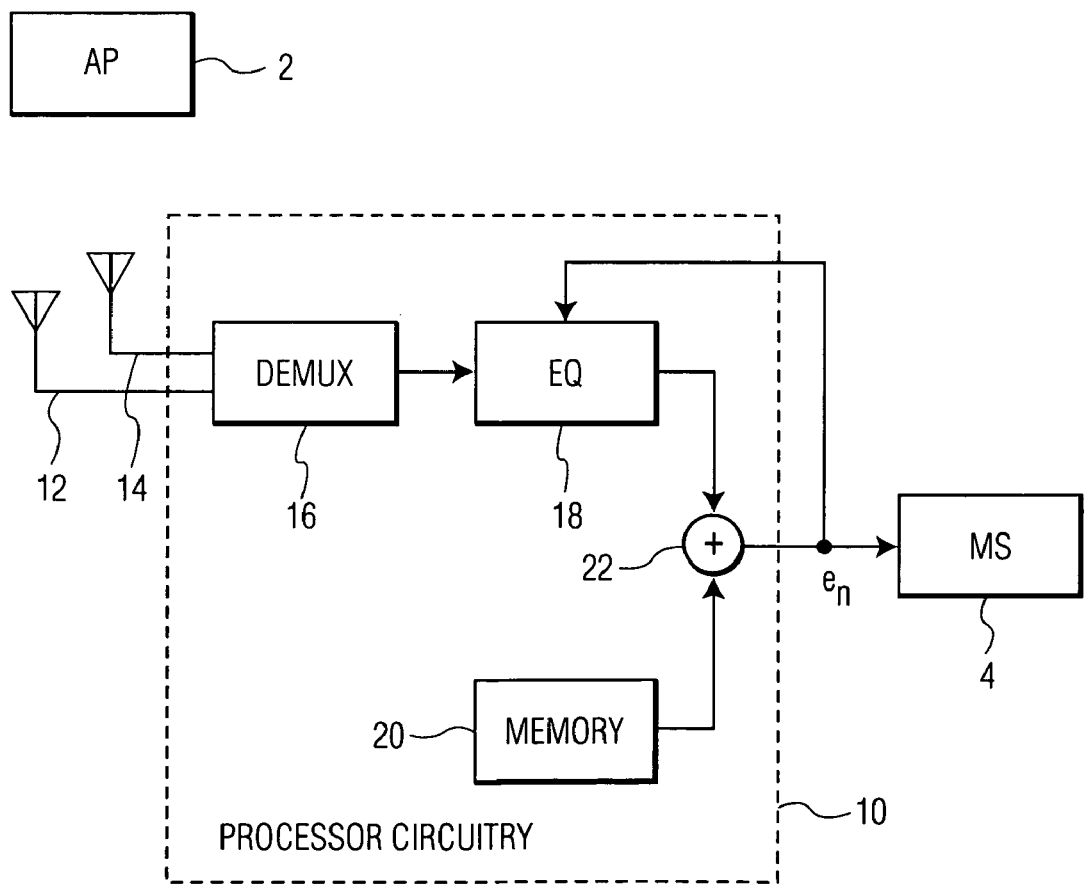
FIG. 2 illustrates the major components of the system according to an embodiment of the present invention.

FIG. 2 shows a simplified block diagram of the processor circuit 10 implemented in the respective mobile station 4 according to an exemplary embodiment of the present invention. The exemplary embodiment of FIG. 2 is for descriptive purposes only, thus other configuration or types of local area networks that employ a server station for forwarding messages back and forth to network stations may be employed. In addition, the AP 2 may be connected to other devices and/or networks within which network stations in the local area network may communicate. As shown in FIG. 2, the mobile station 4 includes: a first antenna 12 and a second antenna 14 configured to transmit and receive data signals over a communications channel; a demodulator 16 for demodulating incoming signals into digital signals; an equalizer 18 for processing the signals received via the antennas 12 and 14; a memory 20, and a comparator 22. A control processor (not shown) is provided in the mobile station 4 to process the signals that are intended for transmission via the antennas 12 and 14.

In operation, the mobile station 4 receives via the first antenna 12 and the second antenna 14 a plurality of incoming data signals which contains preamble header information. The first antenna 12 is configured to receive the beginning portion of the preamble header information, and the second antenna 14 is configured to receive the remaining portion of the preamble header information. The received signals from the respective antennas are demodulated by the demodulator 16 into the corresponding digital signals. The demodulated signals are then forwarded to the equalizer 18 for filtering purposes, after which they are forwarded to the comparator 22. The memory 20 stores a known reference preamble sequence, which is retrieved for comparison with the actual preamble sequence received and filtered by the demodulator 16 and the equalizer 18, respectively. Thereafter, a comparison between the actual preamble sequence from the respective antenna and the reference preamble sequence is performed to determine an error in each symbol sequence. Based on the outcome of the error, one of the antennas 12 and 14 is selected for receiving and processing the remaining incoming signals.

Now, the provision of selecting a desired antenna to enhance the reception of incoming signals according to the present invention will be explained in a detailed description.

Figure 3A:
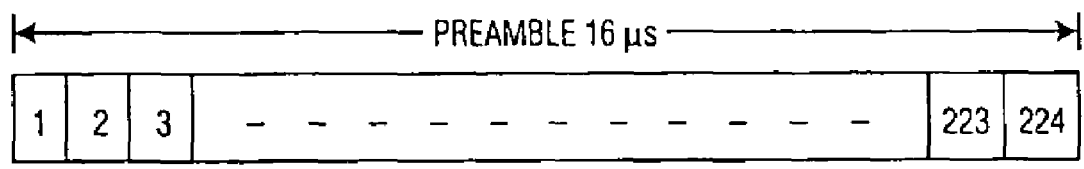
FIG. 3(a) and FIG. 3(b) illustrate frame structures according to an embodiment of the present invention.

FIG. 3(a) shows the preamble frame having a duration of 16 μs (or 224 symbols) as set forth under the 802.11a standard. This preamble consists of 10 short Orthogonal Frequency Division Multiplexing (OFDM) symbols and 2 long OFDM symbols. Each short OFDM symbol (0.8 μs) consists of 12 constellation symbols, and each long OFDM symbol (3.2 μs) consists of 52 constellation symbols. Upon receiving the preamble information, the first antenna 12 calculates the mean-squared error (MSE) of the first 84 symbols (7 short OFDM symbols) of the preamble by comparing the actual preamble sequence received therein with the reference preamble sequence stored in the memory 20. The input is then switched to the second antenna 14, which calculates the MSE of the next 88 symbols (3 short OFDM symbols and 1 long OFDM symbol) of the preamble. The remaining 52 symbols (1 long OFDM symbol) are reserved in case the antenna must be switched back again. After obtaining the output MSE for each antenna, the antenna with the lower MSE is selected for receiving and processing the rest of incoming data packets.

Figure 3B:
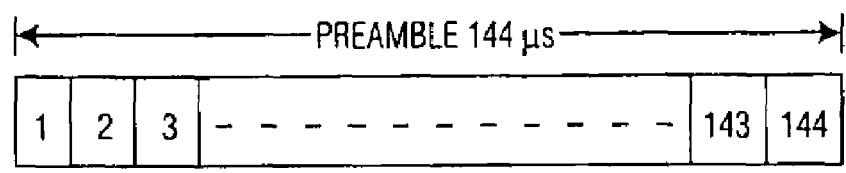

FIG. 3(b) shows the preamble frame having a duration of 144 μs (or 144 symbols at a rate of 1 MHz) as set forth under the 802.11b standard. The first antenna 12 calculates the MSE for the first 60 symbols, and the second antenna 14 calculates the MSE for the next 60 symbols. The remaining 24 symbols are reserved in case the antenna must be switched back again. After obtaining the MSE for the respective antenna, one of the antennas 12 and 14 with the lowest MSE is selected to receive and process the rest of the incoming data packets.

In an alternative embodiment, if the MSE of the first antenna 12 is less than a predetermined threshold value, the antenna switching will not occur. That is, if the MSE of the first antenna 12 is greater than the predetermined threshold value, the antenna switching to the second antenna will occur.

Figure 4A:
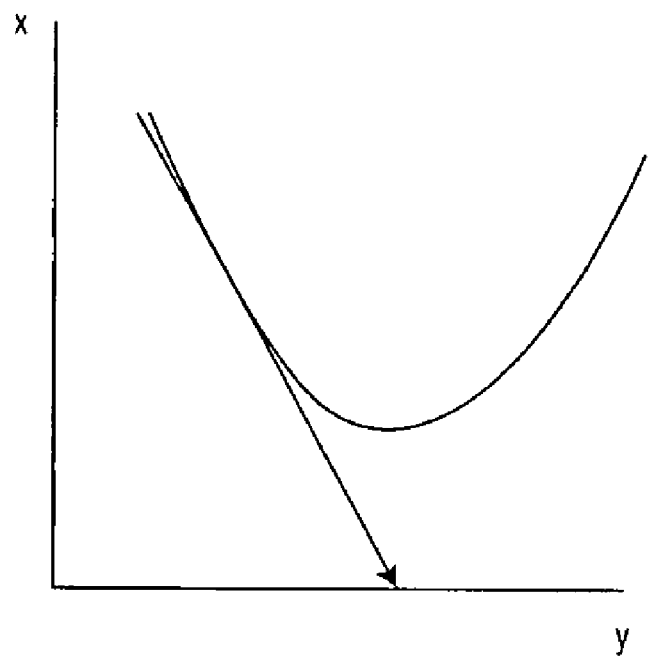
FIG. 4(a) and FIG. 4(b) illustrate a graphical representation of good and bad channels, respectively, according to an embodiment of the present invention; and, FIG. 5 is a flow chart illustrating the operation steps in accordance with the present invention.
Figure 4B:
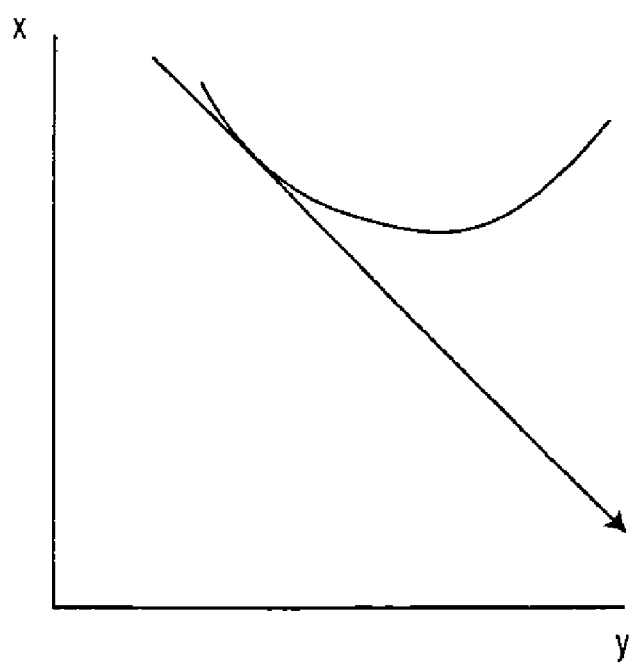

Meanwhile, according to the embodiment of the present invention, an additional parameter, the rate of convergence of the MSE, can be analyzed to determine which antenna should be selected to receive and process incoming signals. That is, a more reliable form of antenna switching can be obtained by examining the rate of convergence of the MSE. For example, FIG. 4(a) represents the MSE plot indicative of a good channel. The y-axis represents the Mean Squared Error, whereas the x-axis represents the step size at each iteration. Here, the rate of convergence has a larger slope and the value of the minimum MSE is lower. In contrast, FIG. 4(b) represents the MSE plot indicative of a poor channel as the rate of convergence is slower (smaller slope), thus the minimum MSE tends to be higher. Accordingly, by examining the convergence rate, a relative measure of which antenna should be selected to obtain the optimal channel quality can be achieved.

Figure 5:
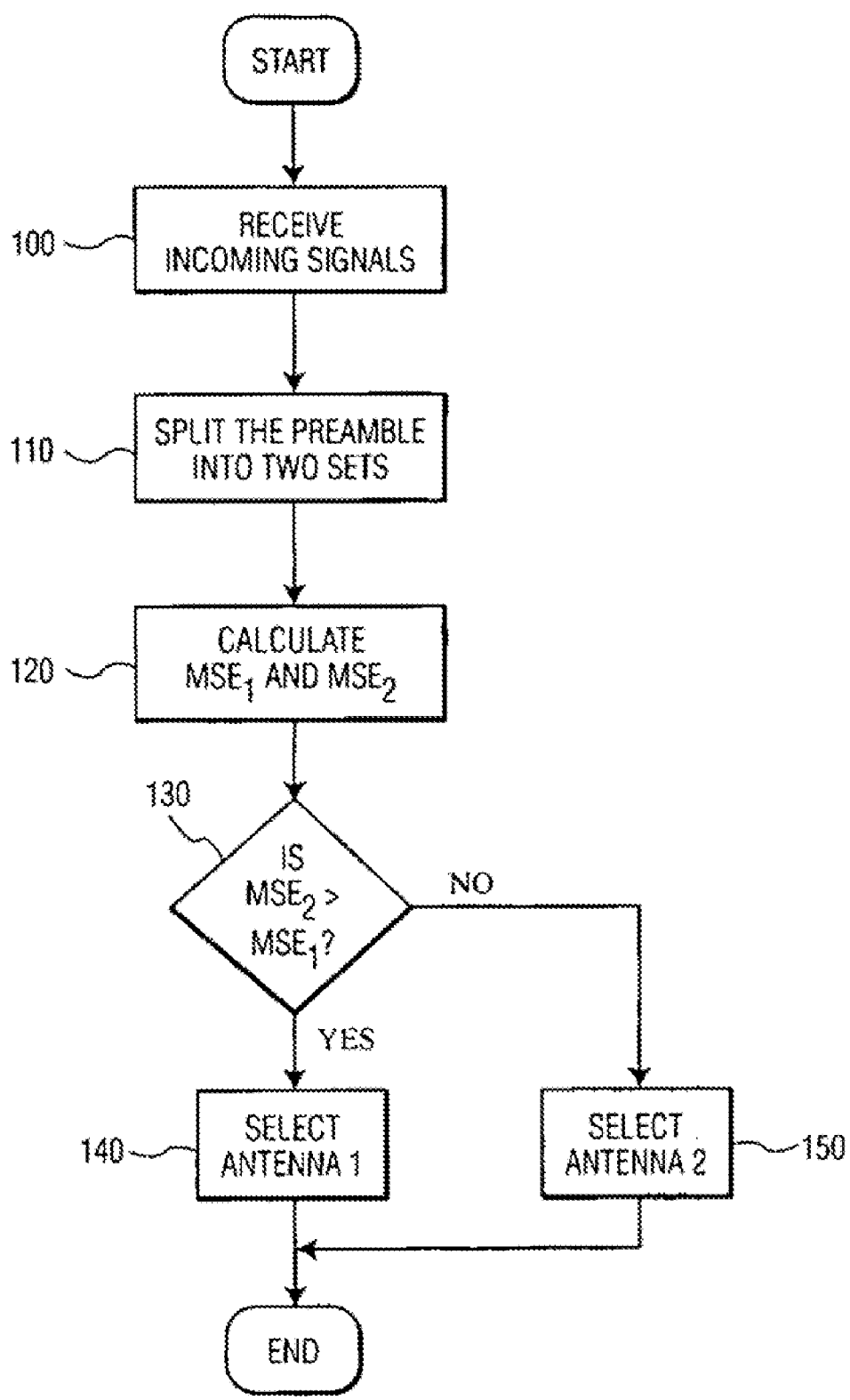

FIG. 5 is a flow chart illustrating the operation steps of antenna switching process according to the embodiment of the present invention. The chosen embodiment of the present invention is a computer software executed within a computer system. The flow diagrams do not depict the syntax of any particular programming language. Rather, the flow diagrams illustrate the functional information that one of ordinary skill in the art requires for fabricating circuits or to generate a computer software to perform the processing required of the particular apparatus. Alternatively, the processing and decision blocks represent steps performed by functionally equivalent circuits such as a digital signal processor circuit or an application specific integrated circuit (ASIC).

In step 100, the antennas 12 and 14 receive incoming signals and in particularly the preamble information. The beginning portion of the preamble information is received by the first antenna 12 and the remaining portion of the header preamble information is received by the second antenna 14 in step 110. The received signals from the respective antenna are processed by the demodulator 16 and the equalizer 18 to produce a processed preamble sequence. Then, the MSE for the respective antenna is calculated, in step 120 by comparing a predetermined preamble sequence with the actual preamble sequence recovered by the respective antenna. In step 130, the calculated MSE from the respective antenna is compared with each other. If the MSE from the first antenna 12 is less than the MSE from the second antenna, the first antenna 12 is selected to receive and process the rest of the incoming signals in step 140. Otherwise, the second antenna 14 is selected to process the rest of the incoming signals in step 150. Alternatively, the antenna switching may be performed based on the rate of the convergence slope with a higher convergence rate, as described with reference to FIGS. 4(a) and 4(b).

As is apparent from the foregoing, the present invention has an advantage in that the inventive scheme provides better criteria for switching the antenna than utilizing a simple signal strength parameter as in the prior art system. In the present invention, it would only require one tuner (front end), thus making the present system more economical than a full antenna diversity system.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed:

1. A method for enhancing signal reception of a digital wireless receiver, the method comprising the steps of:
   extracting a preamble information from a plurality of incoming signals;
   processing a first predetermined portion of said preamble information with a first antenna to produce a first preamble sequence;
   processing a second predetermined portion of said preamble information with a second antenna to produce a second preamble sequence;
   calculating a mean-square error (MSE) for said first preamble sequence received from said first antenna and said second preamble sequence received from said second antenna by separately comparing said first preamble sequence and said second preamble sequence with a predefined preamble sequence;
   generating a time-varying convergence rate based on said calculated MSE for said first preamble sequence and said second preamble sequence; and
   selecting one of said first antenna and said second antenna having a faster convergence rate for subsequent reception of said incoming signals.

2. The method of claim 1, wherein said predefined preamble sequence is known a priori.

3. The method of claim 1, further comprising the step of demodulating said first predetermined portion of said preamble information received by said first antenna to obtain said first preamble sequence.

4. The method of claim 1, further comprising the step of demodulating said second predetermined portion of said preamble information received by said second antenna to obtain said second preamble sequence.

5. The method of claim 1, further comprising the steps of selecting said first antenna for subsequent reception of said incoming signals when the MSE for said first preamble sequence received from said first antenna is lower than a predetermined threshold value.

6. The method of claim 5, further comprising the step of selecting said second antenna for subsequent reception of said incoming signals when the MSE for said first preamble sequence received from said first antenna exceeds said predetermined threshold value.

7. A method for enhancing signal reception of a digital wireless receiver, the method comprising the steps of:
   receiving a plurality of incoming signals, each including header information;
   dividing the header information of said incoming signals to process said divided header information by a first antenna and a second antenna;
   separately comparing said processed header information from said first antenna and said second antenna with a predefined preamble sequence to obtain a mean square error (MSE);
   generating a time-varying convergence rate based on said MSE for said first antenna and said second antenna; and
   selecting one of said first antenna and said second antenna having a faster convergence rate for subsequent reception of said incoming signals.

8. The method of claim 7, wherein the step of dividing the header information of said incoming signals further comprises the step of demodulating the header information of said incoming signals received from said first antenna and said second antenna to obtain said processed header information.

9. The method of claim 7, wherein said predefined preamble sequence is known a priori.

10. The method of claim 7, further comprising the steps of selecting said first antenna for subsequent reception of said incoming signals when the MSE for said first antenna is lower than a predetermined threshold value.

11. The method of claim 10, further comprising the step of selecting said second antenna for subsequent reception of said incoming signals when the MSE for said first antenna exceeds said predetermined threshold value.

12. An apparatus for enhancing signal reception of a digital wireless receiver, comprising:
- a processing circuit for processing a preamble information of incoming signals, wherein a first predetermined portion of said preamble information is received by a first antenna and a second predetermined portion of said preamble information is received by a second antenna to produce a received first portion and a received second portion respectively, and said received first portion and second portion are separately compared to a predefined preamble sequence to obtain a mean-square error (MSE) for the respective first and second antenna, said processing circuit generating a time-varying convergence rate based on said MSE for said first antenna and said second antenna; and
- a selecting circuit for selecting one of said first antenna and said second antenna having a faster convergence rate for subsequent reception of said incoming signals.

13. The apparatus of claim 12, wherein said predefined preamble sequence is known a priori.

14. The apparatus of claim 12, further comprising means for demodulating said preamble information of said incoming signals received from said first antenna and said second antenna prior to comparing.

15. An apparatus for enhancing signal reception of incoming signals of a digital wireless receiver, comprising:
- a first antenna for receiving said incoming signals;
- a second antenna for receiving said incoming signals;
- a processing circuit for processing a preamble information of said incoming signals, wherein a first predetermined portion of said preamble information is received by said first antenna and a second predetermined portion of said preamble information is received by said second antenna to produce a received first portion and a received second portion respectively, and said received first portion and second portion are separately compared to a predefined preamble sequence to generate a mean-square error (MSE) for the respective first and second antenna, said processing circuit generating a time-varying convergence rate based on said MSE for said first antenna and said second antenna; and
- a selecting circuit for selecting one of said first antenna and said second antenna having a faster convergence rate for subsequent reception of said incoming signals.

16. The apparatus of claim 15, wherein said predefined preamble sequence is known a priori.

17. The apparatus of claim 15, further comprising a means for demodulating said preamble information of said incoming signals received from said first antenna and said second antenna prior to comparing.

* * * * *